United States Patent Office 3,334,966
Patented Aug. 8, 1967

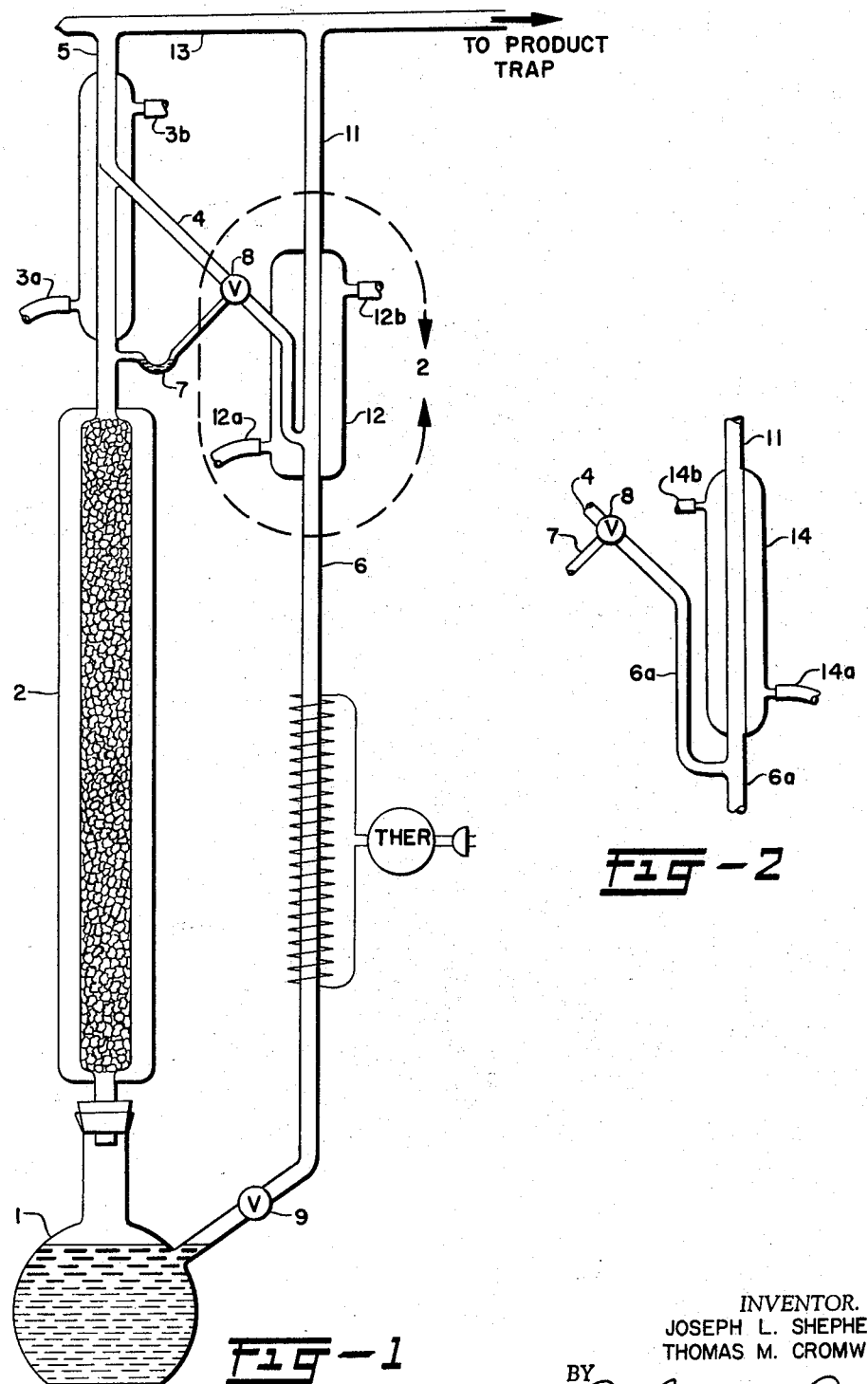

3,334,966
PRODUCTION OF DIBORANE AND BORON TRICHLORIDE
Joseph L. Shepherd, Sunland, and Thomas M. Cromwell, Covina, Calif., assignors to Aerojet-General Corporation, Azusa, Calif., a corporation of Ohio
Filed Mar. 23, 1959, Ser. No. 801,395
3 Claims. (Cl. 23—204)

This invention relates to a novel apparatus and method for effecting the rapid disproportionation of liquids which disproportionate to yield a fraction more volatile than and one less volatile than the starting liquid. The novel apparatus and method of this invention are particularly useful for bringing about the disproportionation of dihaloboranes, such as dichloroborane, to diborane and the corresponding boron trihalides, for purposes of obtaining the diborane.

Diborane is an excellent high energy fuel. Unfortunately, however, its use has been severely limited due to a lack of a convenient and inexpensive method for preparing it in high yield. Diborane as a high energy fuel is particularly valuable for use in conventional liquid bi-propellant rockets. When used for this purpose, diborane is normally burned with an oxidizer, such as fuming nitric acid, in a liquid chamber. The gases thus produced are expelled through an exhaust nozzle and thrust is imparted to the motor, thereby producing forward motion of the rocket. Diborane also finds valuable use in vulcanizing rubber, as disclosed in United States Patent No. 2,558,559.

When it is desirable to effect the disproportionation of a liquid in order to obtain a useful disproportionation product, as, for example, disproportionating dichloroborane to obtain diborane, one method of accomplishing this which usually works is to boil the liquid and then fractionate the resulting vapors for recovery of the desired component therefrom. This method has a disadvantage, however, in that its feasibility depends to a large extent on the rate at which disproportionation equilibrium is reached in the boiling liquid. Thus, in cases where such equilibrium is established only very slowly, the method is usually too slow for practical purposes. The present invention provides a means of rapidly and efficiently bringing about disproportionation of liquids of the latter type, in which disproportionation equilibrium is only very slowly established at boiling temperatures, and of quantitatively recovering the more volatile product of the disproportionation reaction.

The essence of the present invention, as will be clear from the description following, resides in means whereby the vapors from a boiling disproportionation mixture of liquids are fractionated and partially condensed at such temperatures that the most volatile component is removed as a vapor, and the remaining portion, which is enriched in the material being disproportionated, is superheated to bring about rapid disproportionation equilibrium and hence rapid formation of more of the desired component. The liquid disproportionation systems to which the present invention is applicable are those which can be represented by the general reaction scheme set forth below:

$$A \rightleftarrows B + C$$

wherein B is a product less volatile than the starting material A, and C (normally the desired product) is a product more volatile than A.

The foregoing and other features of the present invention will be better understood from the following detailed description and the accompanying drawings, of which:

FIG. 1 is a longitudinal section of a typical embodiment of the apparatus of our invention; and FIG. 2 is a longitudinal section of a modification of that portion of FIG. 1 included within the dotted-line enclosure.

Referring now to FIG. 1, there is shown a boiler 1 with a fractionating column 2 connected in such fashion as to receive the vapors therefrom. The boiler may be of any type well known to those skilled in the art to which heat is supplied, if necessary, by any conventional means (not shown) such as electrical heating elements or other well-known heat source. It is not always necessary to supply heat to the boiler. The only function of the boiler is to contain the boiling liquid, and, in certain cases, it might be necessary to extract heat from the material being treated in order to maintain it in the liquid state. For example, in cases where the disproportionation mixture is gaseous at room temperature and atmospheric pressure, it would be necessary to cool the boiler charge below room temperature rather than to heat it, since otherwise it would be a gas mixture unsuitable for treatment in the apparatus of this invention. That situation obtains where dichloroborane is disproportionated, since both dichloroborane and its disproportionation products are gaseous at room temperature, and when the apparatus of this invention is used for the disproportionation of dichloroborane, the boiler temperature is kept substantially below room temperature in order to sustain the disproportionation mixture as a boiling liquid.

Fractionating column 2 can be of any conventional type, such as a packed column, a bubble cap distillation column, a Podbielniak column, or other suitable distillation column familiar to those skilled in the art. Where the contents of the fractionating column must be insulated to prevent absorption of heat from the surroundings, the column can be protected by a vacuum jacket, such as that shown in the drawing, or other insulating means well known to those skilled in the art. Such insulation is usually necessary when the apparatus is employed for the disproportionation of dichloroborane, to prevent flashing of the reflux liquid in the column.

Positioned atop and in open communication with fractionating column 2 is a condenser 3, having a liquid take-off outlet 4 and a vapor vent 5 joined to a line 13 which leads to a product trap not shown on the drawing. Condenser 3 with its vapor vent 5 and liquid take-off outlet 4 can be of any design suitable for the purpose. Condenser 3 can be cooled by any suitable coolant, such as ice water or the like, which can be easily circulated to and away therefrom by means of inlet and outlet connections 3a and 3b. The temperature within condenser 3 can be maintained at the desired level by thermostat means. Where the product to be recovered is diborane, the product trap, not shown, should be refrigerated to prevent loss of product through vaporization. Liquid nitrogen is suitable for this purpose.

Connected to liquid take-off outlet 4 and extending downwardly towards boiler 1 is a boiler return tube 6 which receives liquid from liquid take-off outlet 4. Also connected to liquid take-off outlet 4 is a tube 7, which refluxes liquid therefrom back into the top of fractionating column 2, as shown. Boiler return tube 6 and tube 7 are connected to liquid take-off outlet 4 through a common valve or cock 8, such as a 2-way cock, whereby the distribution of the liquid from condenser 3 therebetween can be controlled. Boiler return tube 6 extends downwardly and forms a conduit means into boiler 1, as shown. In the lower portion of boiler return tube 6, near its juncture with boiler 1, there is a valve 9 which may be of a well-known type for regulating liquid flow, such as a globe or gate valve. Intermediate valve 9 and valve or cock 8, a heating unit 10 is coiled around boiler return tube 6 for the purpose of creating a heated zone therein. The heating unit may be of any conventional and well-known type, such as a nichrome electrical resistance element, a coil of tubing carrying heated gas or liquid or the like. Heating unit 10 can be connected to any well-known source of heat energy through a conventional control means. For example, where the heating unit is an electrical resistance wire the electric power can be supplied from any convenient outlet. A switch can be used to regulate the flow of current through the wire. Automatic control of the flow of current to the heating unit can be maintained if desirable, by any well-known controller such as a bi-metallic element. Such automatic current control would normally be desirable in a continuous operation in order to assure maintenance of a particular temperature range within the heated zone of boiler return tube 6.

Situated, as shown on the drawing, between heating element 10 and valve or cock 8 is a condenser 12 with a vapor vent 11. Vapor vent 11 connects with line 13 which leads to the above-mentioned product trap. Condenser 12 may employ the same type of coolant and temperature control as condenser 3. The coolant can be circulated to and through condenser 12 by means of inlet and outlet connections 12a and 12b. It is not necessary for boiler return tube 6 to pass through condenser 12, although this is preferred to minimize the chances of vapors from the heated zone of the boiler return tube re-entering the head of the fractionating column. It is preferred that condenser 12 be maintained at substantially the same temperature as condenser 3 since the function of each is to condense the same components of the disproportionation mixture to liquid form while permitting the remaining component to escape as a vapor. Although it is preferred, for reasons given, that return tube 6 pass through condenser 12, there are variations of the apparatus within the scope of the invention in which boiler return tube 6 can bypass condenser 12. An illustration of one such variation is shown in FIG. 2, where the condenser, designated here as 14, is positioned above the juncture of vapor vent 11 and the boiler return tube, designated here as 6a. A distillation column can be substituted for condenser 12, for more efficient separation of the desired product, if desired.

Valve 9 is intended for purposes of regulating the return of liquid which accumulates below the heated zone in boiler return tube 6 to boiler 1. This valve can be manually or automatically controlled in such a way as to periodically or gradually introduce liquid into the boiler. For automatic functioning, the valve can be solenoid controlled or magnetically operated.

In operation, the apparatus of this invention functions as follows in a typical disproportionation process. The liquid to be disproportionated is maintained at a boil in boiler 1, as a result of which disproportionation products are formed. To aid in the explanation, the symbols A, B and C will be employed herein to represent the starting liquid, the product less volatile than A and the product more volatile than A, respectively. The vapors from boiler 1 rise through fractionating column 2, in which the less volatile components are condensed to a certain extent resulting in enrichment of the vapors in the more volatile product C. The thus enriched vapor mixture passes into condenser 3, which is maintained at such temperature as to permit the more volatile component C to pass through vapor vent 5 into conduit 13, through which it flows into the product trap not shown on the drawing. The remaining portion of the vapor condenses and flows into liquid take-off outlet 4. From liquid take-off outlet 4 the liquid, which is enriched in starting material A, is passed either in whole or in part into boiler return tube 6.

The liquid entering boiler return tube 6 flows downwardly into the heated zone in the proximity of heating unit 10, wherein it vaporizes, is superheated and quickly reaches a disproportionation equilibrium. The resulting vapors from the heated zone pass upwardly into condenser 12, which is maintained at the proper temperature to permit the most volatile component C to exit through vapor vent 11 and into conduit 13. In conduit 13, the exit vapor from condenser 12, along with that from condenser 3, flows into the above-mentioned product trap not shown on the drawing. The condensed liquid fraction from condenser 12 falls back down into boiler return tube 6 from whence it came. Over a period of time liquid gradually collects about valve 9 in boiler return tube 6, and this liquid is either periodically or gradually introduced into boiler 1 through valve 9.

The following examples are included for the purpose of illustrating our invention. These examples are intended for illustrative purposes only and should not be construed as limiting the invention to the particular embodiments and limitations set forth therein.

*Example I*

This is an example of the disproportionation of $BHCl_2$ and recovery of the resulting $B_2H_6$ by the method and apparatus of our invention.

A laboratory-scale model of the assembly shown in FIG. 1 was constructed, using a Podbielniak column for the fractionating section and employing glass laboratory equipment throughout. The heating element for the disproportionation section of the assembly was nichrome resistance heating wire, connected through a switch to a source of electric power. The nichrome wire was wrapped around the boiler return tube, as shown in FIG. 1, and covered with insulating cord. Copper-constantan thermocouples were placed at the head of the fractionating column and at the boiler. These thermocouples were connected to a Brown recording potentiometer so that a continuous record could be obtained during the course of the distillation.

The boiler was charged with 60.5 grams of a mixture of $BCl_3$, $BHCl_2$ and $B_2H_6$ containing 10.4 grams of $BHCl_2$ and 0.132 gram of $B_2H_6$, the remainder being $BCl_3$. The amounts of $BHCl_2$ and $B_2H_6$ were determined by infrared analysis.

The Podbielniak column was pressurized to atmospheric pressure and maintained thereat with the aid of manostat. The column was operated on total reflux for about half an hour and then adjusted to a take-off ratio of 90/1. The run was continued for 1½ hours, during which time the temperature of the boiler rose from 9° C. to 17.5° C., and the head temperature rose from 0° C. to 10.5° C. The wrapped portion of the boiler return tube (disproportionator) was heated to a temperature of about 30°–40° C. Observation of the disproportionator during operation of the apparatus indicates that it was performing as predicted. The distillate flashed when it hit the heated zone of the boiler return tube and $BCl_3$ refluxed and returned down the boiler return tube from the condenser. As the distillation progressed, a great percentage of the distillate returned to the boiler.

The material collected in the overhead product trap was subjected to infrared analysis and found to contain 0.1 gram of $BHCl_2$ and 0.670 gram of $B_2H_6$. The boiler was found to contain 0.096 gram of $B_2H_6$. An over-all material balance on the process showed an input of 0.716 gram and an output of 0.766 gram of $B_2H_6$. The input figure is the sum of the $B_2H_6$ present in the charge mixture (0.132 gram) plus the amount of $B_2H_6$ calculated to be equivalent to the quantity of $BHCl_2$ initially charged.

*Example II*

This is another example of the disproportionation of $BHCl_2$ (and recovery of $B_2H_6$) using the apparatus of Example I.

A mixture of $B_2H_6$, $BHCl_2$ and $BCl_3$, weighing 97.59 grams, was charged into the boiler for the Podbielniak column. This mixture contained 7.98 millimoles of $B_2H_6$ and 229.0 millimoles of $BHCl_2$. The boiler temperature was adjusted to 9° C. at which point the mixture became a boiling liquid. From the time the boiling started, the column was operated on total reflux for a period of five minutes and thereafter at a reflux ratio of 60/1 for a period of 50 minutes. The head temperature was −25° C. before boiling started and, during the distillation, the head temperature rose from −14° C. to +10° C.

During the run, 213.5 millimoles of $BHCl_2$ disappeared. This amounted to 93.2% of the $BHCl_2$ calculated to be present originally. The 213.5 millimoles of $BHCl_2$ is equivalent to 35.59 millimoles of $B_2H_6$. From a material balance on the $B_2H_6$ input and output of this example, a $B_2H_6$ recovery of 98.1% was calculated. Here again, as in Example I, the input $B_2H_6$ was calculated as the sum of that initially present in the charge plus that equivalent to the $BHCl_2$ charged.

As explained above, this invention is particularly useful for effecting the disproportionation of dihaloboranes, such as dichloroborane, to recover the resulting diborane. However, applicants wish to have it understood that the apparatus and method of their invention are not limited to this particular application. For example, alkyldihaloborines, such as methyldichloroborine, can be disproportionated and the resulting trialkylborons, such as trimethylboron, recovered from the disproportionation mixtures by means of our novel apparatus and method. The novel apparatus and method of this invention can, in addition, be used for other purposes if desired.

The dihaloborane starting materials, such as dichloroborane, which disproportionate to yield diborane in the apparatus of this invention, can be prepared by passing hydrogen and a boron trihalide, such as boron trichloride, through a heated tube packed with an inert heat transfer material, as more fully disclosed in assignee's copending United States patent application Ser. No. 801,391, filed Mar. 23, 1959.

We claim:

1. A method for continuously effecting disproportionation of a liquid which disproportionates to yield a product more volatile than and one less volatile than the original liquid, and for continuously recovering the more volatile product from the resulting reaction mixture, comprising: boiling the liquid to bring about some disproportionation thereof; fractionating the resulting vapors from the boiling mixture to enrich them in the more volatile disproportionation product; condensing substantially all but the most volatile component of the fractionated vapors in order to recover said component therefrom; superheating the condensed portion of the fractionated vapors to vaporize it and bring about disproportionation equilibrium thereof in the vapor form; condensing substantially all but the most volatile component of the superheated vapor mixture to recover said component therefrom; and recirculating the condensed portion of the superheated vapors to the original boiling solution of the starting liquid and its disproportionation products.

2. A method for effecting disproportionation of dichloroborane to diborane and boron trichloride, and for recovering the diborane from the resulting disproportionation mixture, comprising: boiling the dichloroborane to bring about some disproportionation thereof to diborane and boron trichloride; fractionating the vapors from the resulting disproportionation liquid mixture to enrich them in diborane; condensing substantially all of the dichloroborane and boron trichloride in the fractionated vapors to separate the diborane from said vapor mixture; superheating the condensed portion of the fractionated vapors, which are enriched in dichloroborane, to bring about vaporization of the liquid and effect rapid disproportionation equilibrium thereof in the vapor form; and condensing substantially all of the boron trichloride and dichloroborane from the superheated vapors to permit substantial separation and recovery of the diborane therefrom.

3. A method for effecting disproportionation of a dihaloborane to diborane and a boron trihalide, and for recovering the diborane from the resulting disproportionating mixture, comprising: boiling the dihaloborane to bring about some disproportionation thereof to diborane and boron trihalide; fractionating the vapors from the resulting disproportionating liquid mixture to enrich them in diborane; condensing substantially all of the dihaloborane and the boron trihalide in the fractionated vapors to separate the diborane from said vapor mixtures; superheating the condensed portion of the fractionated vapors which are enriched in dihaloborane, to bring about vaporization of the liquid and effect the rapid disproportionation equilibrium thereof in the vapor form; and dihaloborane from the superheated vapors to permit substantial separation and recovery of the diborane therefrom.

References Cited

UNITED STATES PATENTS

| 1,966,852 | 7/1934 | Dvornikoff | 202—56 X |
| 2,037,537 | 4/1936 | Ritchie | 208—77 X |
| 2,573,807 | 11/1951 | Piros et al. | 202—153 |
| 2,575,688 | 11/1951 | Smith | 202—153 |
| 2,664,391 | 12/1953 | Coulter | 202—40 |
| 2,752,294 | 6/1956 | Lazare | 202—40 |
| 3,007,768 | 11/1961 | Edwards et al. | 23—204 X |
| 3,051,629 | 8/1962 | Gorin | 202—22 X |
| 3,077,441 | 2/1963 | Shinjiro Kodma et al. | 202—56 X |

OTHER REFERENCES

Introduction to Chemical Engineering, Badger and Banchero, McGraw-Hill Publishing Co., New York, 1955, pp. 258, 259 and 285.

Journal of American Chemical Society, volume 71, pp. 20–22, January 1949 (article by Hurd); volume 53, pp. 4321–4323 and 4326–4332, December 1931 (article by Schlesinger).

OSCAR R. VERTIZ, *Primary Examiner.*

ROGER L. CAMPBELL, CARL D. QUARFORTH,
*Examiners.*

H. T. DAVIS, S. F. STONE, W. T. HOUGH,
M. WEISSMAN, *Assistant Examiners.*